United States Patent
Higurashi et al.

(10) Patent No.: US 6,538,705 B1
(45) Date of Patent: *Mar. 25, 2003

(54) IMAGE PROJECTING SYSTEM

(75) Inventors: Masaki Higurashi, Hachioji (JP); Tatsuo Nagasaki, Yokohama (JP); Yasuhiro Komiya, Hachioji (JP); Koutatsu Oura, Chofu (JP); Ken Ioka, Yokohama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/698,510

(22) Filed: Oct. 26, 2000

Related U.S. Application Data

(63) Continuation of application No. 08/865,723, filed on May 30, 1997, now Pat. No. 6,222,593.

(30) Foreign Application Priority Data

Jun. 6, 1996 (JP) ............................................... 8-144248

(51) Int. Cl.$^7$ .............................. H04N 9/28; H04N 9/31
(52) U.S. Cl. ........................ 348/745; 348/744; 348/806; 348/807; 348/813; 315/368.12; 353/34
(58) Field of Search ................................ 348/745, 806, 348/807, 813, 744, 756, 751, 761, 781, 750, 746, 747, 190; 315/11.5, 368.11, 368.12; 353/34, 30, 28, 122; 349/5, 6, 8; H04N 9/28, 9/31

(56) References Cited

U.S. PATENT DOCUMENTS

| | | | | |
|---|---|---|---|---|
| 4,656,521 A | * | 4/1987 | Trzeciak et al. | 348/744 |
| 4,974,073 A | | 11/1990 | Inova | 348/38 |
| 5,114,224 A | * | 5/1992 | Miyamoto et al. | 353/122 |
| 5,136,390 A | * | 8/1992 | Inova et al. | 348/383 |
| 5,136,397 A | * | 8/1992 | Miyashita | 348/748 |
| 5,200,815 A | * | 4/1993 | Tsujihara et al. | 358/60 |
| 5,287,173 A | * | 2/1994 | Onuma et al. | 348/655 |
| 5,331,359 A | * | 7/1994 | Leclercq | 353/28 |
| 5,353,074 A | * | 10/1994 | Jones et al. | 353/122 |
| 5,475,447 A | * | 12/1995 | Funado | 348/745 |
| 5,532,764 A | * | 7/1996 | Itaki | 348/745 |
| 5,537,159 A | * | 7/1996 | Suematsu et al. | 348/745 |
| 5,546,139 A | * | 8/1996 | Bacs, Jr. et al. | 348/754 |
| 5,734,446 A | * | 3/1998 | Tokoro et al. | 348/745 |
| 5,788,354 A | * | 8/1998 | Murai et al. | 353/97 |
| 5,795,048 A | * | 8/1998 | Umei | 353/122 |
| 5,838,396 A | * | 11/1998 | Shiota et al. | 348/744 |
| 5,875,006 A | * | 2/1999 | Nagae et al. | 348/751 |
| 5,883,476 A | * | 3/1999 | Noguchi et al. | 315/368.12 |
| 6,128,048 A | * | 10/2000 | Cho | 348/745 |

FOREIGN PATENT DOCUMENTS

| | | |
|---|---|---|
| JP | 2-306782 | 12/1990 |
| JP | 5-107639 | 4/1993 |
| JP | 6-141246 | 5/1994 |
| JP | 6-161404 | 6/1994 |
| JP | 6-178327 | 6/1994 |
| JP | 8-168039 | 6/1996 |
| JP | 9-326981 | 12/1997 |

* cited by examiner

Primary Examiner—John Miller
Assistant Examiner—Jeaz W. Désir
(74) Attorney, Agent, or Firm—Frishauf, Holtz, Goodman & Chick, P.C.

(57) ABSTRACT

In a system according to the invention, fine image data 2 created and output by a personal computer 1 is input to an image processing/dividing section 4. The image processing/dividing section 4 determines, on the basis of parameters stored in a projector arrangement storage 5, which portion of the fine image data 2 is output to which projector, thereby performing a predetermined processing. Digital signals from the image processing/dividing section 4 are input to a plurality of D/A converters 6, respectively, where the signals are converted to analog signals. Images in the form of the analog signals are projected onto a screen 8 from projectors 7a–7d. Thus, the image projected on the screen 8 is constituted of accurately positioned images, and hence is a very fine image.

20 Claims, 13 Drawing Sheets

EACH LINE SEGMENT
HAS LENGTH L

EACH LINE SEGMENT HAS
LENGTH L'm=L1m+L2m

IMAGE PROJECTING SYSTEM

This application is a continuation of application Ser. No. 08/865,723, May 30, 1997, now U.S. Pat. No. 6,222,593.

BACKGROUND OF THE INVENTION

This invention relates to an image projection system for synthesizing, on a screen, images projected from a plurality of projectors to thereby obtain a very fine image.

In the conventional case of representation directed to a great number of people, an over head projector or a slide projector has been used.

In accordance with the spread of personal computers and the replenishment of application software, a representation system as a combination of a personal computer and a projection display (hereinafter referred to simply as a "projector") has come to be employed. This system is characterized in that it is not necessary to print, on an OHP sheet, an image or a manuscript created on the screen of the personal computer, or to photograph such an image or a manuscript using a slide film. In the case of a natural image, in particular, the system is characterized in that the colors of the image which are viewed in an image-creating stage can be reproduced without degradation. A projector of this type mainly employs a liquid crystal panel which is lighter and can be installed in an easier manner than the conventional CRT (Cathode Ray Tube) display monitor.

Referring to FIG. 23, an example of a representation system as a combination of a personal computer and a liquid crystal projector will be described.

In FIG. 23, image/manuscript data created on the screen of a personal computer 201 is output from the computer to a processing control section 206 incorporated in a liquid crystal projector 202, through a monitor output terminal incorporated in the computer. The processing control section 206 of the liquid crystal projector 202, in turn, processes the input image data and then outputs it to a liquid crystal panel (LCP) 204. The liquid crystal panel 204 displays an image corresponding to the input image data. Light emitted from a light source 203 is projected onto a screen 208 via a projection lens 207, after the transmissivity of the light is determined on the basis of the gradation of the image displayed on the liquid crystal panel 204.

The resolution of the image projected from the liquid crystal projector 202 is, however, determined on the basis of the number of pixels incorporated in the liquid crystal panel. Although a projector is now available that can receive an image signal of a higher resolution than that of the liquid crystal panel, it is adapted to thin original image data to make the data comply with the number of pixels of the liquid crystal panel, which means that the projector cannot reflect the resolution of the original image.

Moreover, there is also a projector which displays part of an original image and scrolls to make the overall image appear. This projector is, however, disadvantageous in that it cannot show the overall image at one time. To overcome this disadvantage and so obtain a finer projection image, it is necessary to increase the number of pixels incorporated in the liquid crystal panel of the projector. Such a very fine liquid crystal projector is extremely expensive, and hence is not applicable to general use.

Furthermore, when a liquid crystal panel of a high resolution is used, the load upon a process controller incorporated in the projector system will increase, and this panel requires a large display area. Accordingly, the efficiency of use of source light will decrease thereby darkening the projected image.

In addition, to project an accurate image, it is necessary to accurately horizontally dispose the main body of the projector, or to align the main body with the screen. If the projector is not accurately disposed, the projected image may well be angularly displaced, or be "swung and tilted".

Also, Japanese Patent Application KOKAI No. 2-306782 discloses a technique for inserting a pre-prepared image (insertion image) into an image photographed by a TV camera. More specifically, the insertion image is inserted into the photographed image by being artificially swung and tilted in a direction in which the camera is situated (this processing is called "perspective transformation"). Supposing that the insertion image is expressed by the (x, y) coordinates and the photographed image is expressed by the (X, Y) coordinates, the primary perspective transformation is given by the following equations (1):

$$X = m \cdot (d \cdot x + e \cdot y + f)/(a \cdot x + b \cdot y + c)$$
$$Y = m \cdot (g \cdot x + h \cdot y + i)/(a \cdot x + b \cdot y + c) \quad (1)$$

Application of this technique to an image projected by the projector, however, requires means for detecting the projection direction of the projector.

BRIEF SUMMARY OF THE INVENTION

The present invention has been developed under the above-described circumstances, and aims to provide an image projection system constituted of a combination of a personal computer, a plurality of projectors and a controller for dividing a fine input image and outputting an image signal to each projector, and capable of obtaining a very fine projection image which reflects the resolution of input data indicative of the fine input image.

According to a first aspect of the invention, there is provided an image projection system which comprises image generating means for generating fine image data; image projection means having a plurality of projectors for projecting at least part of a fine image corresponding to the fine image data; and image processing means for selectively processing at least part of the fine image data and outputting the processed data to the projectors.

According to a second aspect of the invention, the image processing means incorporated in the image projection image includes: parameter storage means for storing parameters necessary for processing for projecting accurate images by the projectors; and image dividing/processing means for processing and dividing the fine image data into data items on the basis of the parameters, and outputting the divided and processed data items to the projectors, respectively.

According to a third aspect of the invention, the image projection system further comprises: photographing means positioned in the vicinity of the viewpoint of an observer for photographing a projection image; and parameter calculating means for calculating projector arrangement parameters on the basis of data indicative of an image obtained by photographing the projection image by the photographing means.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

The embodiments of the invention will be described with reference to the accompanying drawings.

Figure 1:
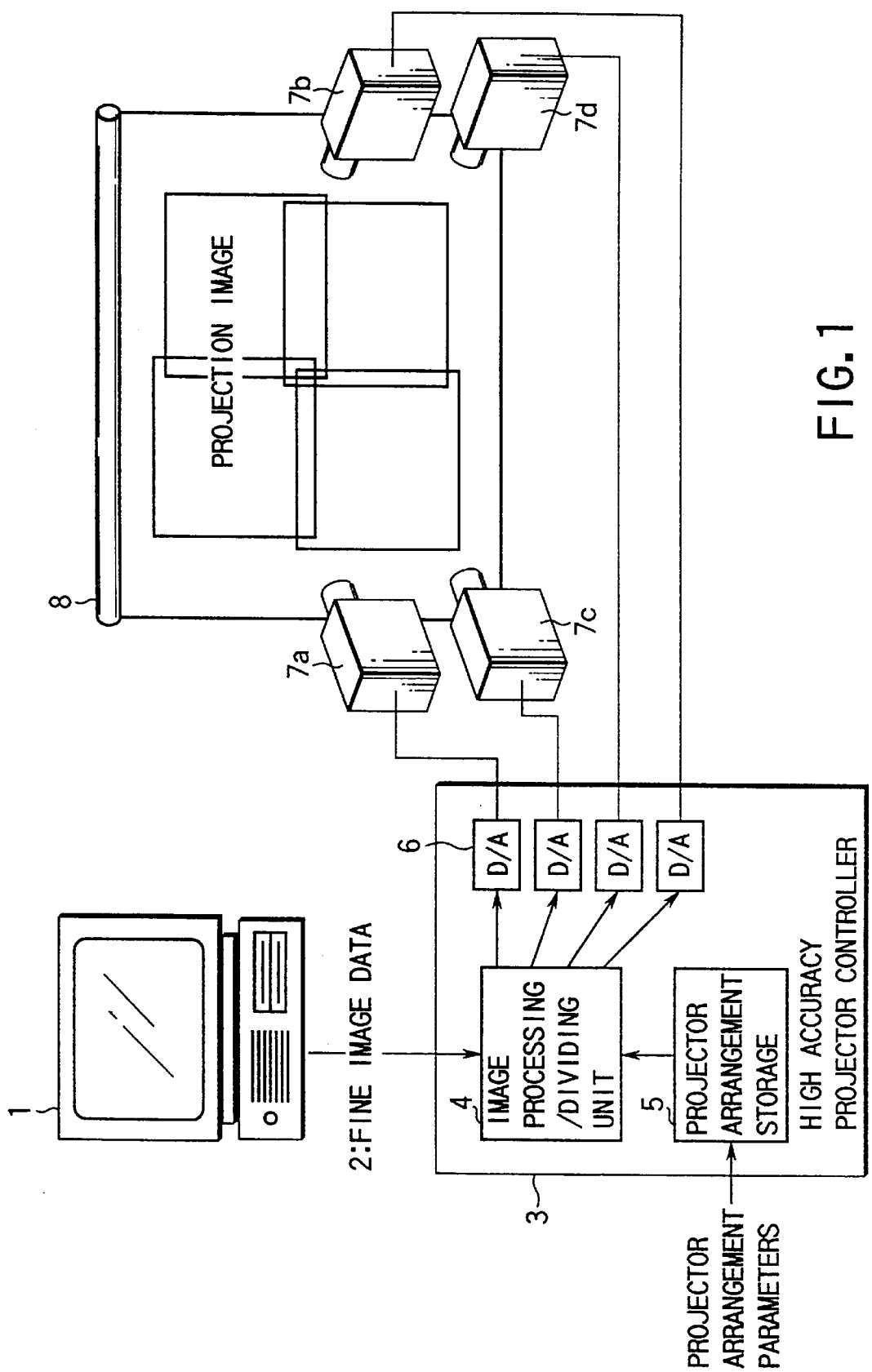
FIG. 1 is a view, showing the structure of an image projection system according to a first embodiment.

FIG. 1 shows the structure of an image projection system according to a first embodiment.

As is shown in FIG. 1, the image projection system of the embodiment mainly comprises a personal computer 1 for creating an image or a manuscript and outputting data 2 indicative of a very fine image, a highly refined projector/controller section 3 for processing and dividing the data 2 input from the personal computer 1, and a plurality of projectors 7a–7d.

The highly refined projector/controller section 3 includes an image processing/dividing section 4, a projector arrangement storage 5, D/A converters 6, and a control section (not shown) for controlling these elements.

In the above structure, the fine image data 2 created by the personal computer 1 is output to the image processing/dividing section 4 of the projector/controller section 3. The image processing/dividing section 4 determines, on the basis of parameters prestored in the projector arrangement storage 5, which portion of the fine image data 2 should be output to which projector, thereby performing predetermined processing. The functions of the parameters stored in the projector arrangement storage 5 and the operation of each element such as the image processing/dividing section 4, etc. will be described later.

A signal output from the image processing/dividing section 4 is supplied to the D/A converters 6, where it is converted to analog signals. Images corresponding to the analog signals are projected onto a screen 8 via the projectors 7a–7d. Thus, the images, which are accurately positioned on the screen, constitute a very fine image.

Figure 2A:
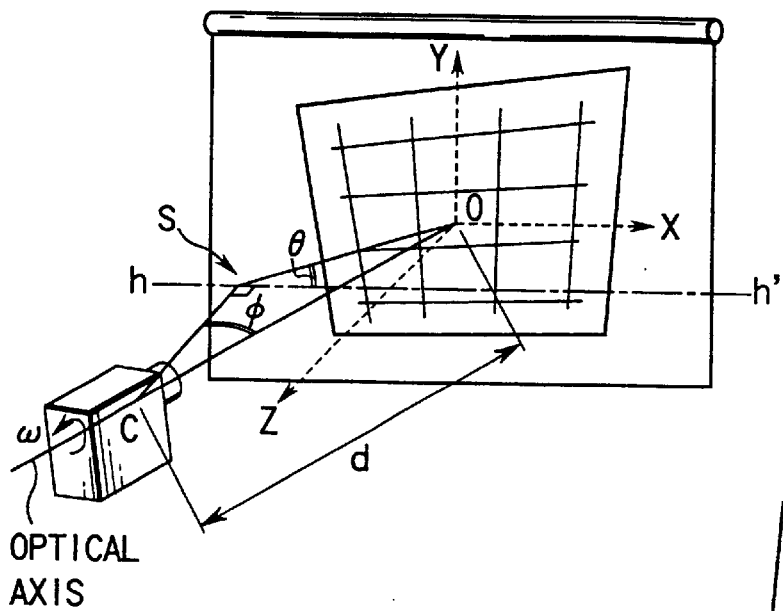
FIG. 2A is a view, useful in explaining a method for obtaining an accurate projection image which has all portions thereof magnified with the same magnification, where a liquid crystal projector 7 is not aligned with a screen 8.

Referring then to FIG. 2, a method will be described, which enables a projection image free from imperfect superposition even when the liquid crystal projectors 7 are not aligned with the screen 8.

Where the liquid crystal projectors 7 are not aligned with the screen 8, portions of an image projected on the screen are magnified with different magnifications, and accordingly the image may well be a "swung & tilted" image as shown in FIG. 2A. How an image is projected onto the screen 8 is determined by the distance d between each projector 7 and the screen 8 along the optical axis of the projector, the angle-of-rotation ω of the projector 7, an angle θ (indicative of a direction in which a projection image will swing & tilt) between the ZX plane and a plane determined from the optical axis of the projector 7 and a vertical line C-S drawn from a reference point C of the projector 7 to the screen 8, and an angle ("swing & tilt" angle) φ between the vertical line C-S and the optical axis of the projector 7.

Concerning an image input to the projector 7, suppose that the image is expressed by the (x, y) coordinates, with its center set as origin o. Further, concerning an image projected on the screen 8 and corresponding to the input image, suppose that the projection image is expressed by the (X, Y, O) coordinates, with the intersection of the screen and the optical axis of the projector set as origin O (the X-axis and the Y-axis indicate the horizontal direction and the vertical direction, respectively, and the Z-axis indicates the normal line of the screen). Then, the relationship between (x, y) and (X, Y) is expressed by the following equations (2)–(4)

$$\begin{pmatrix} X \\ Y \end{pmatrix} = \begin{pmatrix} m(cx \cdot z3 - x3 \cdot cz)/(z3-cz) \\ m(cy \cdot z3 - y3 \cdot cz)/(z3-cz) \end{pmatrix} \quad (2)$$

$$p3 = (x3, y3, z3)^T = R \cdot (x, y, 0)^T \quad (3)$$

$$C = (cx, cy, cz)^T = R \cdot (0, 0, d)^T$$

$$R = (R3 \cdot R2 \cdot R1)$$

$$R1 = \begin{pmatrix} \cos(\omega - \theta) & \sin(\omega - \theta) & 0 \\ -\sin(\omega - \theta) & \cos(\omega - \theta) & 0 \\ 0 & 0 & 1 \end{pmatrix} \quad (4)$$

$$R2 = \begin{pmatrix} \cos\phi & 0 & \sin\theta \\ 0 & 1 & 0 \\ -\sin\phi & 0 & \cos\phi \end{pmatrix}$$

$$R3 = \begin{pmatrix} \cos\phi & \sin\theta & 0 \\ -\sin\phi & \cos\theta & 0 \\ 0 & 0 & 1 \end{pmatrix}$$

where T put upper right of each matrix represents "transposition", m a scaling factor depending upon the distance d to the screen, R a matrix which indicates a matrix rotated by θ, by φ and by ω, and C the position of a reference point of the projector in the XYZ coordinate plane.

Figure 2B:
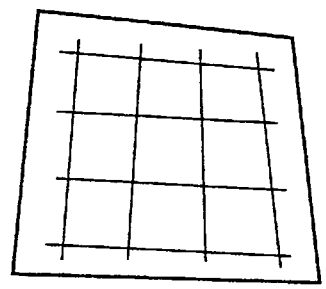
FIG. 2B is a view, showing an image having its distortion corrected beforehand.

An accurate projection image with all portions thereof magnified with the same magnification as shown in FIG. 2B can be obtained by correcting the "swung & tilted" projection image by back calculation based on d, θ, φ, and ω. This will be described in detail later. Although it has been described that the projection state is determined from d, θ, φ, and ω, it is a matter of course that other parameters may be used only if the projection state can be accurately grasped and corrected by them.

FIG. 3 shows the relationship between an original image and an image to be output to each projector.

Figure 3A:
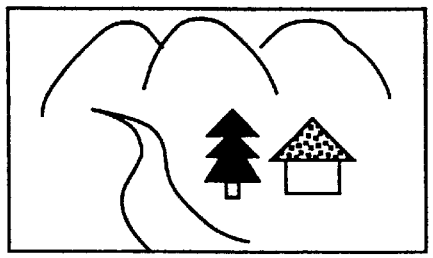
FIG. 3A shows an original image.
Figure 3D:
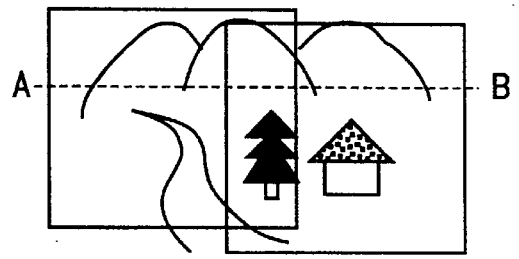
FIG. 3D shows an image projected on a screen.
Figure 3B:
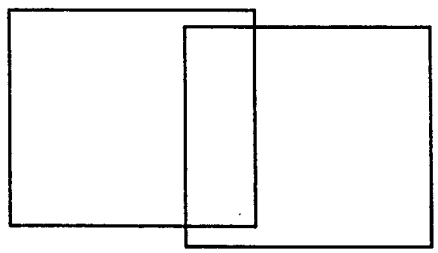
FIG. 3B shows the position of projection of each projector.
Figure 3E:
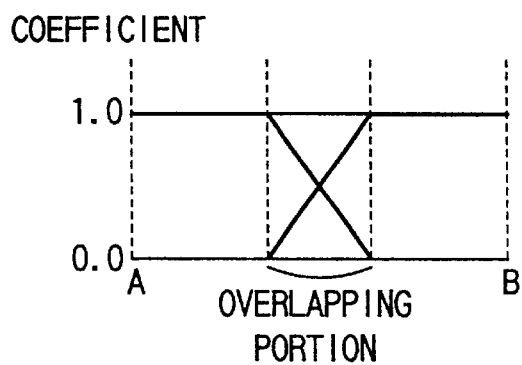
FIG. 3E shows data concerning an image overlapping area.
Figure 3C:
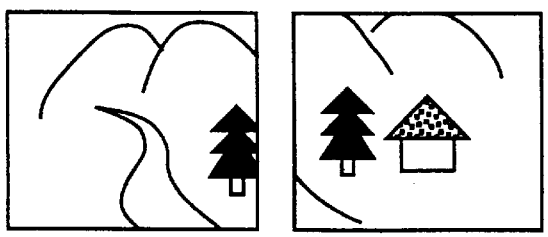
FIG. 3C shows an image to be input to each projector.

FIG. 3A shows a very fine original image as compared with the resolution of each projector. This image is output to two projectors with the positional relationship shown in FIG. 3B. In this case, if an image deviated downward from an image to be input to a left one of the projectors is input to a right one as shown in FIG. 3C, an image substantially the same image as the original image can be projected onto the screen as shown in FIG. 3D.

The overlapping portions of the images are aligned with each other, using an image overlapping technique disclosed in, for example, Japanese Patent Application No. 6-141246. The portions to be connected to each other can smoothly be connected by applying a technique for making a plurality of images overlap each other, i.e. by supplying the projector with data obtained by multiplying data indicative of the original image by a coefficient as shown in FIG. 3E.

Figure 3F:
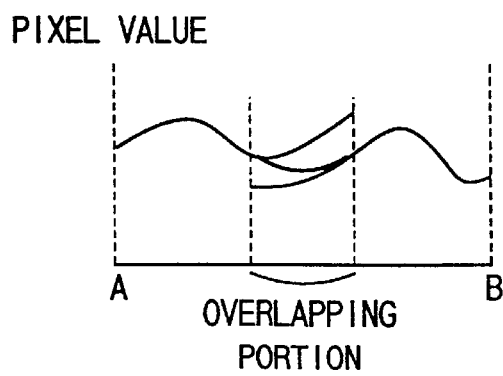
FIG. 3F shows data concerning images connected to each other.

FIG. 3F shows an example of a smoothly connected image. A line (for example, a line connecting points A and B in FIG. 3B) of each of two images is indicated by the broken line. The solid line in FIG. 3F indicates data of a projection image obtained by multiplying each data item by a corresponding coefficient shown in FIG. 3E. The FIG. 3B case was explained above supposing that the projectors have the same magnification. However, a case where the projectors have different magnifications can be processed by changing the sizes of image portions selected in FIG. 3C.

The above-described methods are applicable even to the case of using three or more projectors. Moreover, there is a case where no fine projection image, which consists of clear projection images of pixels, will be obtained from a liquid crystal panel having a relatively small number of pixels and hence an optically coarse surface. There is also a case where the moire phenomenon will be caused in an overlapping portion by projectors with different magnifications. These phenomena can be prevented by, for example, deviating the focus of the overall projection image to thereby obtain blurred projection images of each pixel. Although in the FIG. 3 case, the coefficient to be multiplied in each overlapping portion is linearly varied, it may be varied non linearly or along, for example, a sine function. It suffices if the overlapping portions are connected smoothly.

Figures 4A, 4B:
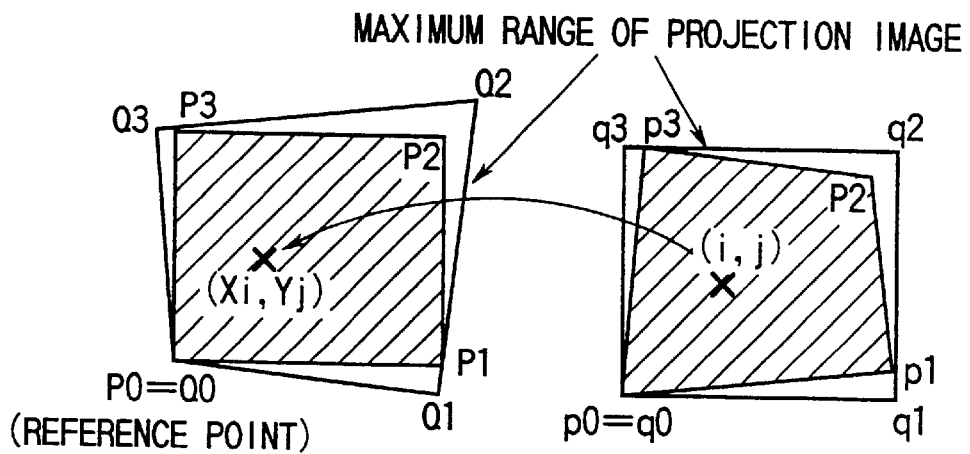
FIG. 4A shows a projected image.
FIG. 4B shows an image to be input to a projector.

Referring then to FIGS. 4A and 4B, a manner for creating a "swing & tilt"-corrected image will be described.

FIG. 4A shows a projection image, while FIG. 4B shows image data to be input to a projector. An area Sq enclosed by four points q0–q3 indicates a maximum image which can be input to the projector. The projection image of the maximum image corresponds to an area SQ enclosed by four points Q0–Q3.

A hatched area SP enclosed by points P0–P3 and shown in FIG. 4A is used at the time of actual projection and corresponds to a projector input image area Sp enclosed by points p0–p3. The reference point of the area SP is the point P0 at which two sides form a maximum angle. The points P1 and P3 are intersections between horizontal and vertical lines extending from the point P0 and corresponding sides of the area SQ, respectively. The point P2 is a point which forms a rectangle together with the other three points. Further, the area Sp enclosed by the points p0–p3 is the part of an image input to the projector, which corresponds to the area Sp.

The position (i, j) of a pixel included in the projector input image is converted to (Xi, Yj) by means of the above-described formula (2). The values of the pixel position (i, j) correspond to those of the position (Xi, Yj) of a pixel included in an original image selected for each projector as shown in FIG. 3C. If the values Xi and Yj are not integers, they are subjected to a known interpolation such as linear interpolation, bi-cubic interpolation, etc. Moreover, if the converted values Xi, Yj do not fall within the area SP, they are considered zero. Although in this embodiment, the area Sp is set as described above, it may be set to be situated in any other position and have any other size, only if it is situated within the area SQ.

Figure 5:
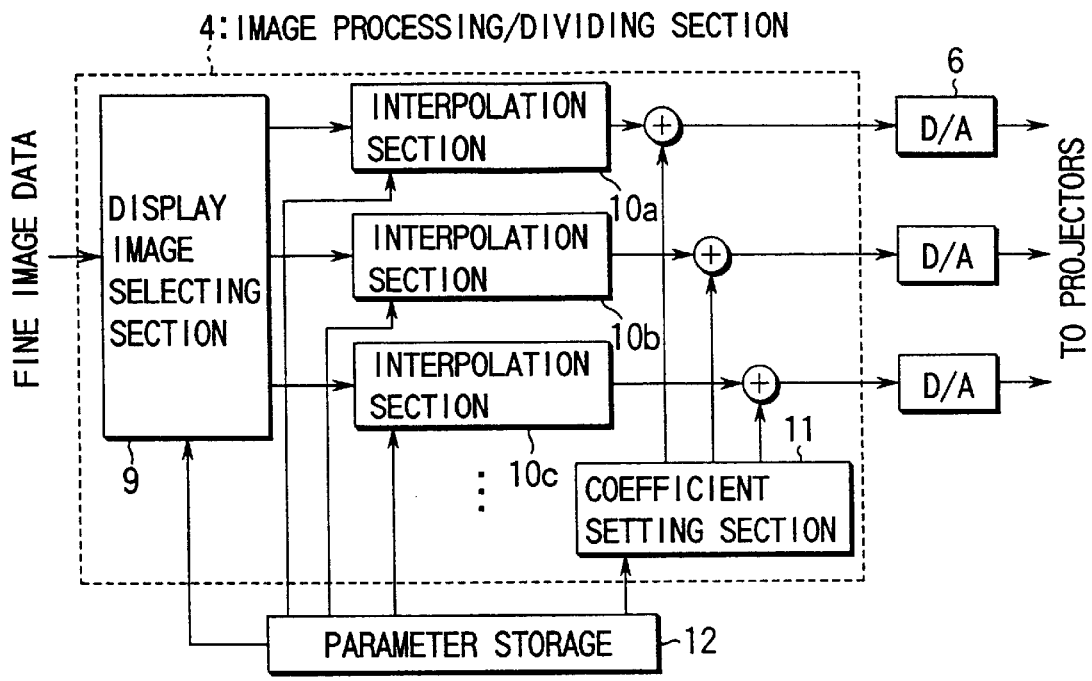
FIG. 5 is a block diagram, showing an image processing/dividing section 4 in detail.

Referring then to FIG. 5, the image processing/dividing section 4 for performing the above conversion will be described in more detail. As is shown in FIG. 5, the image processing/dividing section 4 further comprises a display image selecting section 9, interpolation sections 10 and a coefficient setting section 11. As described with reference to FIG. 3, the display image selecting section 9 obtains, from a parameter storage 12, parameters for determining the part of an original image which can be projected by the projector system of this embodiment, thereby determining the part of the original image which is projected on each projector, and outputting images for a plurality of projectors.

Each interpolation section 10 reads, from the parameter storage 12, parameters for rotation, shift and "swing & tilt" of a corresponding projector, and subjects the parameters to interpolation so that each image output from the display image selecting section 9 can be correctly projected onto the screen. The coefficient setting section 11 reads, from the parameter storage 12, an overlap parameter for images projected on the projectors, thereby setting a coefficient as shown in FIG. 3F so that overlapping images can be connected smoothly. The set coefficient is multiplied by an image output from the interpolation section 10, thereby forming a final image to be output to the corresponding projector via a D/A converter 6.

Figure 6A:
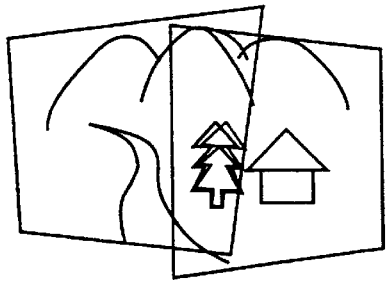
FIG. 6A shows imperfect superposition of common image portions included in images projected from right and left projectors.

FIG. 6 shows a process for determining a projection image in the image dividing/processing section 4 when both the right and left projectors are swung and tilted.

Figure 6B:
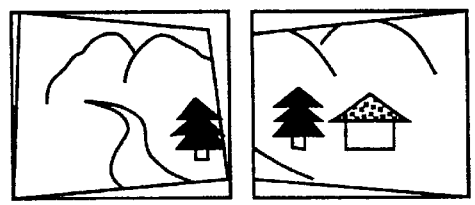
FIG. 6B shows images obtained by correcting the imperfect superposition.
Figure 6C:
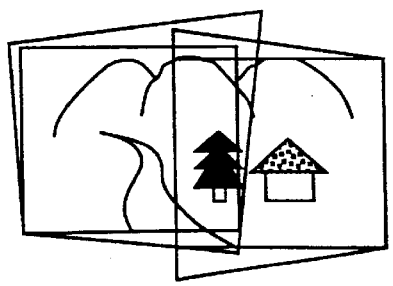
FIG. 6C shows an image obtained by projecting the images of FIG. 6B.

In this case, the right image is swung and tilted in the horizontal direction, and the left image is swung and tilted obliquely at an upper right portion thereof. If in this state, the same image as in FIG. 3C is projected, a blurred projection image will be obtained. To avoid this, the right and left images are converted using a "swing & tilt" parameter stored in the parameter storage 12, thereby obtaining a projection image as shown in FIG. 6B. As a result, a very accurate image with great fidelity to the original image is projected onto the screen as shown in FIG. 6C.

Although in this embodiment, data is supplied to each projector in the form of an analog signal, it can be supplied in the form of a digital signal when the projector has a digital signal input terminal. In this case, no D/A converter is necessary.

An image projection system according to a second embodiment of the invention will be described.

The second embodiment comprises a calculator for calculating parameters used to determine the arrangement of projectors, as well as the components employed in the first embodiment.

Figure 7:
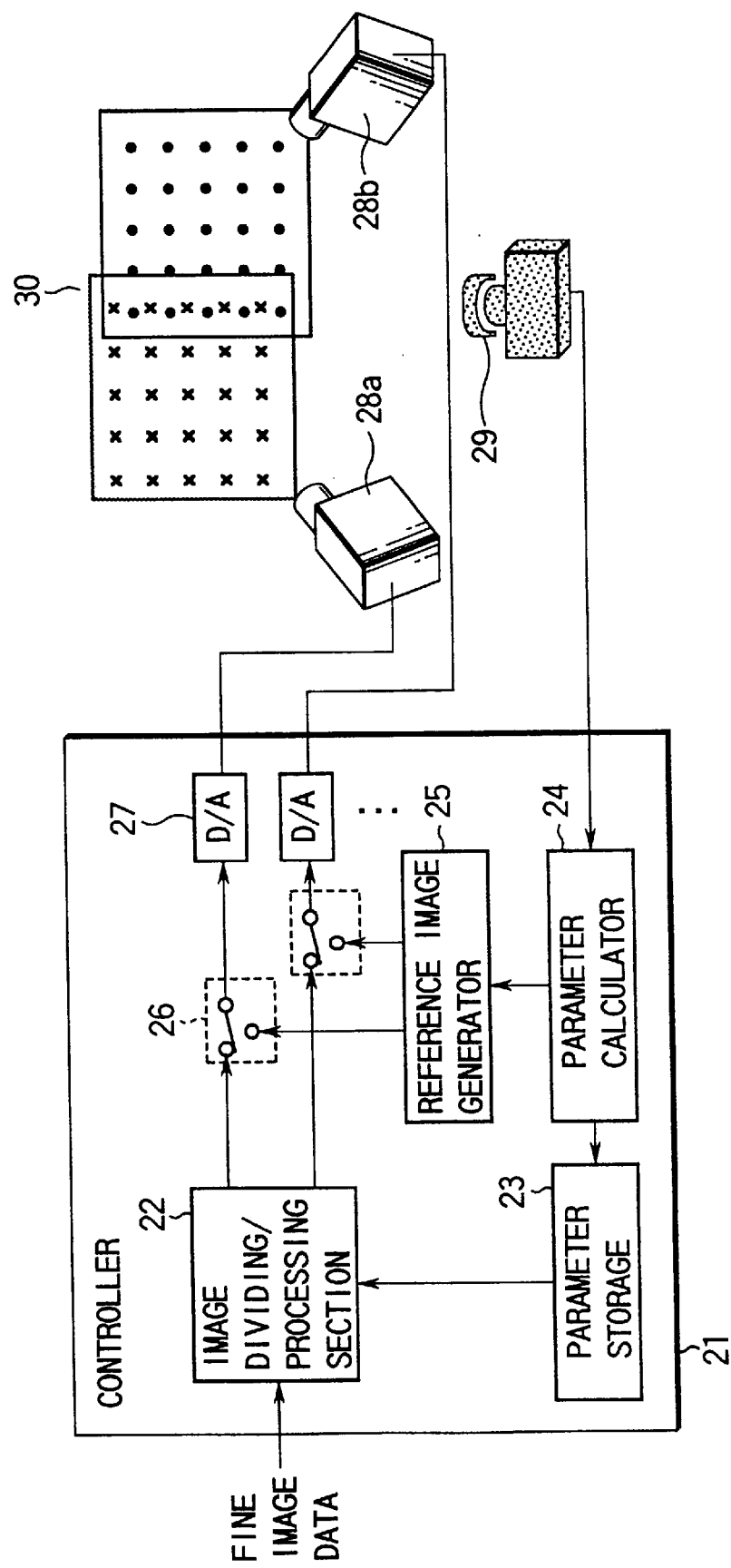
FIG. 7 is a view, showing the structure of an image projection system according to a second embodiment.

FIG. 7 shows the structure of the image projection system of the second embodiment.

As is shown in FIG. 7, the system mainly comprises a controller 21, projectors 28 and a digital camera 29. The digital camera 29 is located close to a person who will actually see a representation, etc. on the screen, and is disposed to take a picture of a projection image 30. At the time of setting the projectors, an image switch section 26 is switched so as to cause a reference image generated by a reference image generator 25 to be projected. The projected reference image is photographed by the digital camera 29, and then input to a projector arrangement parameter calculating section 24 incorporated in the controller 21, whereby parameters (d, θ, φ, ω) for determining the arrangement of projectors are calculated.

The thus calculated parameters are stored in a projector arrangement storage 23, and read, when necessary, by an image processing/dividing section 22. The image processing/dividing section 22 uses the read parameters for creating an image to be output to the projectors 28 through a D/A converter 27. Although in this embodiment, the reference image generator 25 is used for generating the reference image at the time of setting the projectors, it is a matter of course that the reference image generator 25 may be used as a reference image storage.

Figure 8:
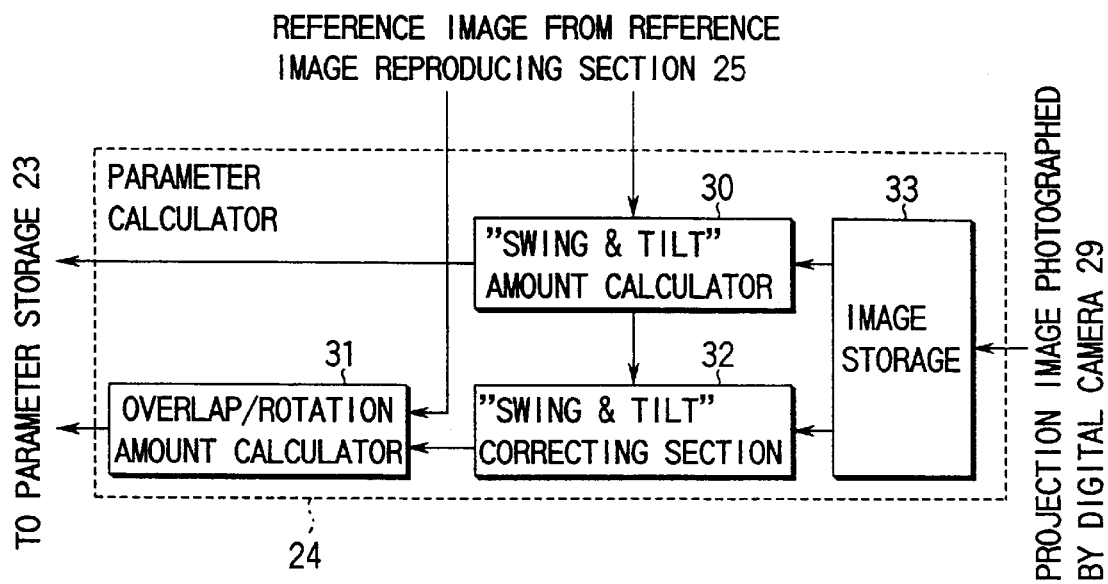
FIG. 8 is a view, showing a structure of a parameter calculating section 24 in detail.

FIG. 8 shows a detailed structure of the parameter calculating section 24.

As is shown in FIG. 8, the parameter calculating section 24 comprises a "swing & tilt" amount calculator 30, an overlap/rotation amount calculator 31, a "swing & tilt" correcting section 32, and an image storage 33.

In the above-described structure, an image photographed by the digital camera 29 is temporarily stored in the image storage 33. The stored image is read when necessary, and compared with the reference image in the "swing & tilt" amount calculator 30, thereby obtaining "swing & tilt" parameters. These parameters are input to both the parameter storage 23 and the "swing & tilt" correcting section 32.

The "swing & tilt" correcting section 32 corrects the image photographed by the digital camera 29, to an image corresponding to a projection image which has its "swing & tilt" corrected. The overlap/rotation amount calculator 31 calculates, from the thus-obtained image, the overlap and rotation degrees of projection images projected by the projectors 28, and outputs the calculated degrees to the parameter storage 23.

The projection image 30 projected to calculate the parameters and photographed by the digital camera 29 can have various well-known patterns such as a pattern in which bright points or lattice points are arranged at regular intervals, a chequered pattern, etc. It suffices if the above-mentioned parameters can be accurately obtained from the pattern.

The parameters may be determined for each projector 28 by sequentially projecting images from the projectors 28. Alternatively, the parameters may be determined for each projector 28 by projecting images of different colors from the projectors 28 and designating each of the colors of an image photographed by the digital camera 29.

Figure 9A:
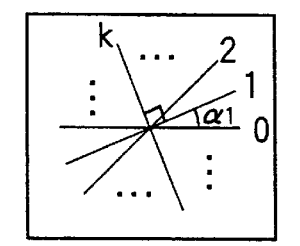
FIG. 9A is a view, useful in explaining a method for calculating a parameter by displaying line segments of the same length L and different angles in several occasions.
Figure 9B:
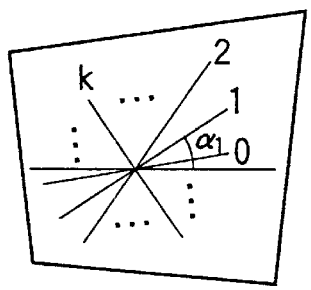
FIG. 9B is a view, useful in explaining a method for calculating a parameter by displaying line segments of different lengths Lk' and different angles in several occasions.

Referring then to FIG. 9, a method employed in the second embodiment will be described, in which method the parameters are calculated by displaying linear line segments of different angles in several occasions.

Suppose that where a line segment with a length L passing a center portion of an image is displayed on the projector 28 with an angle a αm (m=0, 1, 2, . . . ) formed between the line segment and a horizontal line (FIG. 9A), a line segment which has a length L'm and an angle α'm is observed in a photographed image (the angle α'm is formed between the line segment in the photographed image and a horizontal line; and the length L'm consists of a length $L_1$m between the center of the photographed image and one end point of the line segment, and a length $L_2$m between the center and the other end point of the line segment, i.e. L'm=$L_1$m+$L_1$m). In this case, the rotational angle ω of the image is given by $$\omega = \alpha'm - \alpha m \quad (5)$$

Further, supposing that a line segment 2 assumes a maximum length L'm, a direction θ in which the image is swung and tilted is given by $$\theta = \alpha 2 \quad (6)$$

Moreover, supposing that the line of a direction which intersects the line segment 2 is k, $L_1$m and $L_2$m are defined by (L/L'k).

11 $m = L1m^* (L/L'K)$

12 $m = L1m^* (L/L'K) \quad (7)$

From the above equations, parameters φ, d are obtained by the following equations (8):

$$\cos\phi = \frac{l1m + l2m}{2 \cdot l1m + l2m} L \quad (8)$$

$$d = \frac{2 \cdot l1m + l2m}{|l1m - l2m|} \cdot \sin\phi$$

Figure 10:
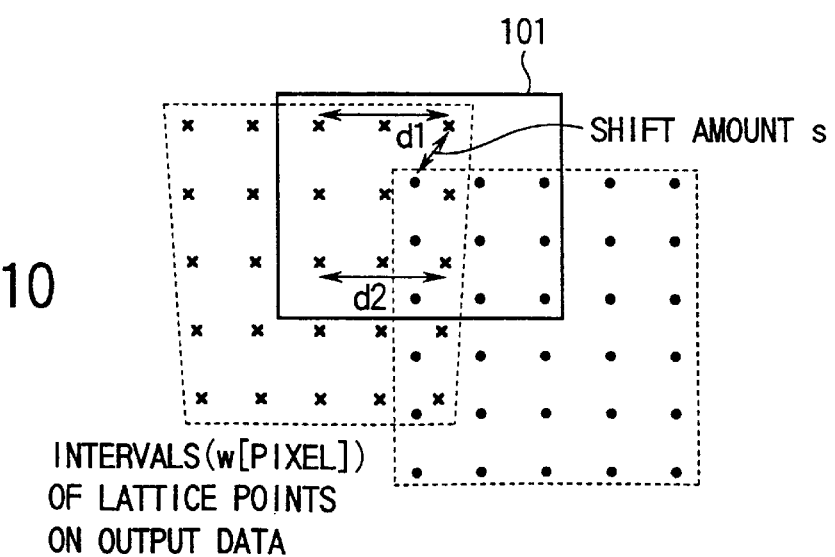
FIG. 10 is a view, useful in explaining the case of using lattice points as examples of projection images 30 to be projected at the time of calculating a parameter.

Referring to FIG. 10, the projection image 30 to be projected at the time of calculating the parameters will be described, taking, as an example of the image 30, a projection image consisting of lattice points.

In FIG. 10, the areas enclosed by the broken lines indicate images projected by projectors, and the area enclosed by the solid line indicates the photographing range of the digital camera 29. As is shown in FIG. 10, the right and left projection images overlap each other, and the left projection image is swung and tilt in the vertical direction.

First, a position corresponding to each lattice point of the projection images is calculated by binarization or the pattern matching method on the basis of an image 101 photographed by the digital camera.

In one of the projection images (the left projection image in FIG. 10), each parameter in the equation (2) is calculated in order to correct the "swing & tilt" state of the projection image, on the basis of positions on the image photographed by the digital camera, the ratio between distances d1, d2,..., and the positions/intervals w [pixel] of lattice points on an image actually input to the projectors.

Since the positions of the lattice points input to the projectors are predetermined, the positional relationship between the projection images on the screen can be calculated on the basis of a shift amount s on the image 101 of the digital camera.

Although in the FIG. 10 case, an overlapping portion of the projectors is photographed by the digital camera, the overall projection images may be photographed if they have sufficient resolutions. Also, the camera may incorporate a control section for first performing rough calculation using an image having its entire portion photographed, then enlarging a portion of the photographed image, and accurately determining the parameters from the enlarged portion of the image. Furthermore, a sequential feedback method (e.g. steepest descent method) may be employed, in which an image to be projected is gradually deformed so that a photographed image corresponding to the projection image will approach an ideal photographed image.

Although the above embodiments employ a plurality of projectors, "swing & tilt" correction similar to the above can be performed in the case of employing only one projector.

Where the projection image is greatly swung and tilted, it is greatly blurred. This disadvantage can be avoided by incorporating, in the projection lens of the projector, an optical unit called a "swing & tilt" state correcting lens.

Figure 11:
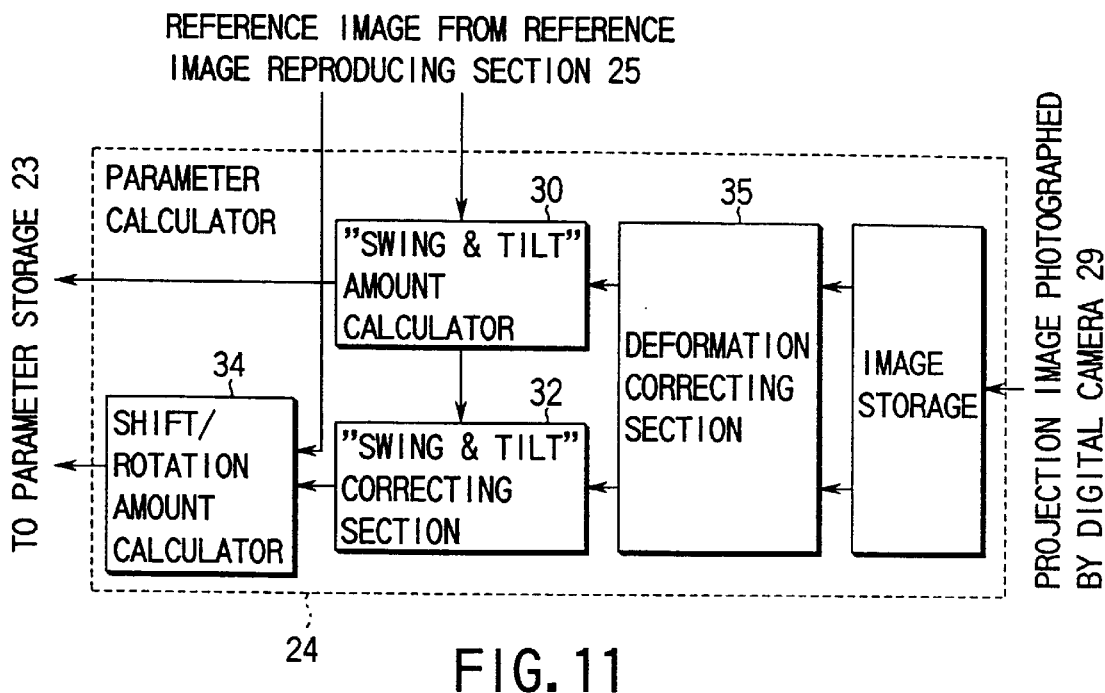
FIG. 11 is a block diagram, showing another structure of the parameter calculating section 24.

Referring then to FIG. 11, another structure of the parameter calculating section 24 will be described.

This parameter calculation section is similar to that shown in FIG. 8 except that it further comprises a distortion correcting section 35 for correcting a distorted image photographed by the digital camera.

It is highly possible, in general, that space-variant distortion will occur in a camera lens.

Such space-variant distortion is not desirable in the system of the invention, since parameters are determined on the basis of an image obtained by photographing a projection image. Therefore, a distorted image is corrected before it is used for parameter calculation, with the result that accurate parameters can be calculated. Distortion correction can be performed easily if the digital camera has a structure for storing the focal position of its lens.

Although in the second embodiment, data indicative of an image obtained by photographing a projection image is directly input from the digital camera 29 to the projector arrangement parameter calculating section 24, it can be input to the section 24 via a floppy disk, a PC card, etc.

In addition, although in the embodiments, the digital camera is used to photograph a projection image, a general CCD camera, video camera, etc. may be used in place of the digital camera, if an image input board or an A/D converter is additionally employed.

An image projection system according to a third embodiment of the invention will be described.

Figure 12:
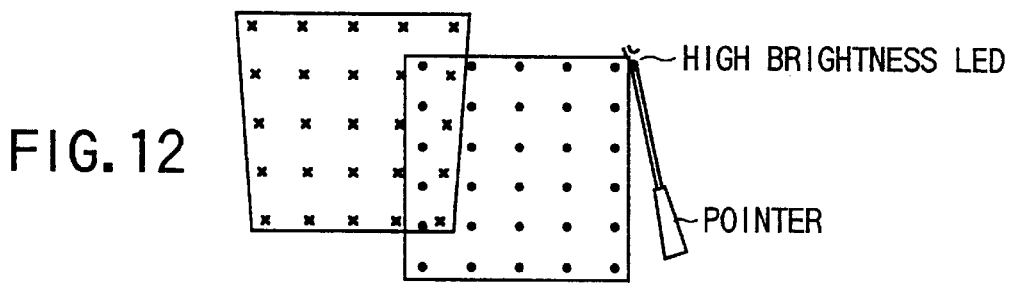
FIG. 12 is a view, useful in explaining a third embodiment in which a projection image on a screen is photographed by pointing characteristic points (such as summits, lattice points, etc.) of the image, using a pointer with a high brightness LED provided on a tip portion thereof.

FIG. 12 shows a case where a projection image on a screen is photographed by pointing characterizing points of the image such as lattice points or corner points, using a pointer with a high brightness LED provided on its tip.

Since in this case, the pointed points are much brighter than the other portions of the projection image, characterizing points can be extracted very easily from an image photographed by the digital camera. Further, the high brightness LED pointer may be replaced with a laser pointer.

Figure 13:
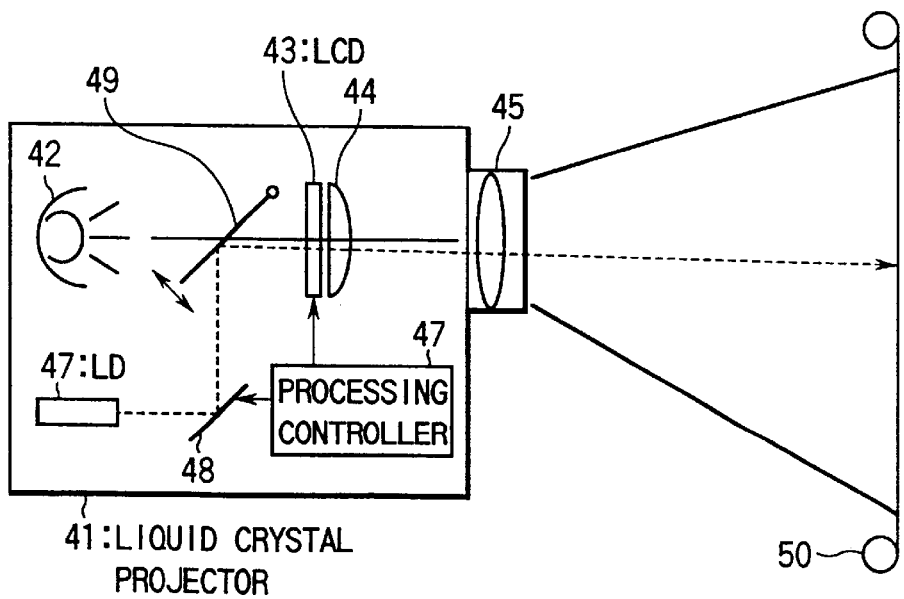
FIG. 13 is a view, showing a pointing device incorporated in a projector according to the third embodiment.

FIG. 13 shows the case of incorporating a pointing device in a projector. As is shown in FIG. 13, an image is displayed on a LCP 43, and projected onto a screen 50 when light is emitted from a light source 42 and passes the LCP 43, an optical system 44 and a projector lens 45. A laser beam (indicated by the broken line) emitted from a semiconductor laser (LD) 46 reflects from mirrors 48 and 49 and reaches the screen.

The mirror 49 is of a swingable type. This mirror is situated across the optical axis of the light source 42 as shown in FIG. 13 at the time of pointing for determining the projection state, and is situated parallel to the optical axis at the time of projecting an image. A processing controller 47 controls the LCP 43 for image display and adjusts the angle of the mirror 48, thereby radiating the characterizing points of a to-be-projected image with a laser beam.

The pointing device located in each projector enables accurate and automatic designation of the characterizing points. Further, the swingable mirror 49 can enhance the efficiency of use of light emitted from the LD 46.

Although in the third embodiment, a laser beam is projected onto the screen through the LCP 43, it is a matter of course that the mirror 49 may be positioned closer to the screen than the LCP 43. Moreover, data on an image photographed by the digital camera 29 can be designated by means of a mouse, etc. of a personal computer while the image is displayed on its screen. Any method for accurately designating the characterizing points can be employed.

Figure 14:
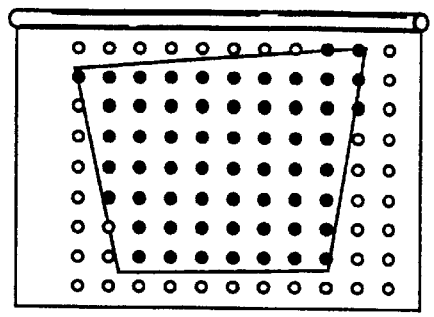
FIG. 14 is a view, showing multiple fine optical sensors provided on a screen in the third embodiment for determining the state of projection.

FIG. 14 shows an example, in which the state of a projection image is detected by fine optical sensors provided on the screen. In this case, black dots indicate sensors on which a projection image is projected, while white dots indicate sensors on which the projection image is not projected. Thus, determining the sensors radiated with light detects the state of the projection image. The important thing is to calculate parameters which enable accurate designation of the characterizing points, which means that the invention can be carried out by a structure other than the above-described ones.

Figure 15:
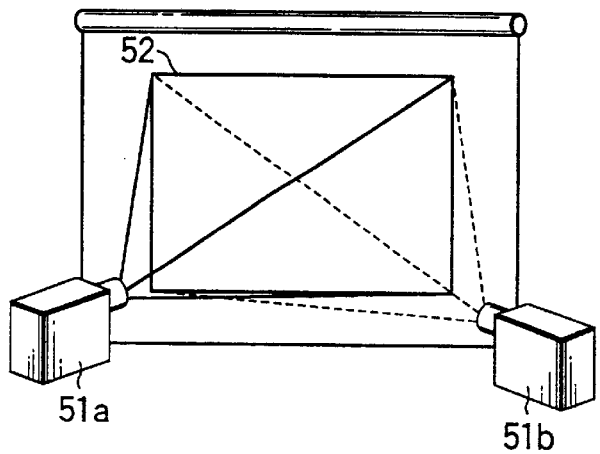
FIG. 15 is a view, useful in explaining an image projection system according to a fourth embodiment.

Referring then to FIG. 15, an image projection system according to a fourth embodiment of the invention will be described.

This embodiment is directed to a high-brightness multi-gradient projector unit comprising a plurality of projectors.

In this case, a projection image 52 is formed by accurately superposing images projected from at least two projectors 51. If images identical to each other are generated from both projectors, the brightness of a projection image on the screen is twice the brightness of a projection image generated from only one projector. Therefore, the system of the fourth embodiment functions as a high brightness projector unit.

Further, in general, an image is displayed in 256 color gradients ranging from color 0 to color 255. In the fourth embodiment, however, an image of a (255×N+1) color gradation can be obtained by using a number N of projectors. For example, where two projector are used, data with a data value of 114 is divided into two data items each having a data value of 57 and input to the two projectors, while data with a data value of 317 is divided into a data item with a data value of 159 and a data item with a data value of 158, and input to the two projectors. Thus, a projection image of a 510 gradation at maximum can be obtained (data items each having a data value of 255 are input to the two projectors, respectively).

Since as described in the second embodiment, automatic positioning is performed on the basis of data on an image obtained by photographing a projection image from the viewpoint of the observer, thereby outputting corrected images to the projectors, the system of the fourth embodiment can be carried out very easily.

In addition, it is possible to display a three-dimensional image by imparting parallax to images output from the projectors. Since the system of the invention can make the most of the resolution of each projector, a three-dimensional image of a higher resolution than ever can be displayed.

An image projection system according to a fifth embodiment will be described with reference to FIG. 16.

The invention is also applicable to a spherical screen shown in FIG. 16, as well as the flat screen used in the above-described embodiments.

Figure 16A:
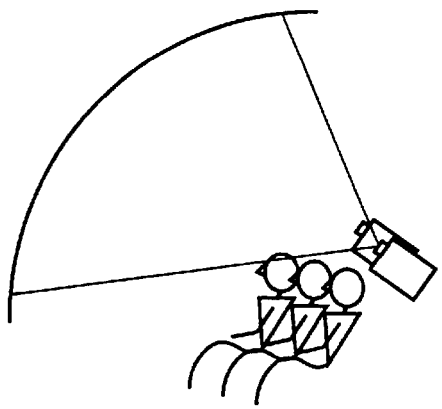
FIG. 16A is a view, useful in explaining an image projection system for several persons according to a fifth embodiment.

FIG. 16A shows a projection system for multiple observers.

Since in this case, images can be displayed in a wide area, the observers can see them with good reality. This projection system can be set very easily.

Figure 16B:
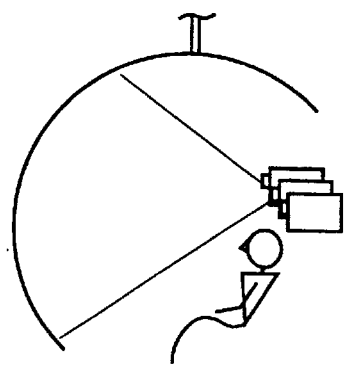
FIG. 16B is a view, useful in explaining an image projection system for a single person according to the fifth embodiment.

This embodiment can be also applicable to a personal projection system as shown in FIG. 16B. There is a conventional case where reality is created by providing the head of an observer with a device called a "HMD (Head Mounted Display)". In the FIG. 16B case, however, such a special device as the HMD is not necessary, and hence the observer can see the display very comfortably without a sense of oppression. Further, the observer does not need to see the display at a minimum distance therefrom, which means that the observer can avoid the application of a great load to his or her eyes and can enjoy an image of a higher resolution than that of the HMD.

Figure 16C:
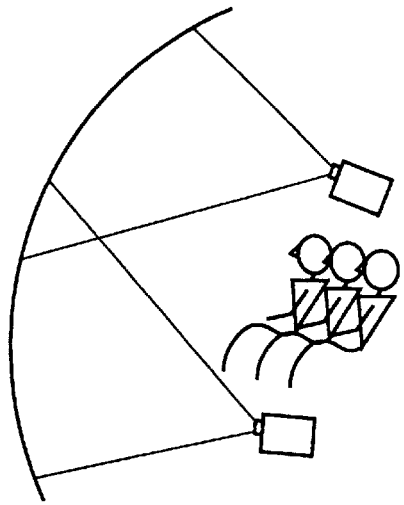
FIG. 16C is a view, useful in explaining an image projection system according to the fifth embodiment and employing projectors located vertical.
Figure 16D:
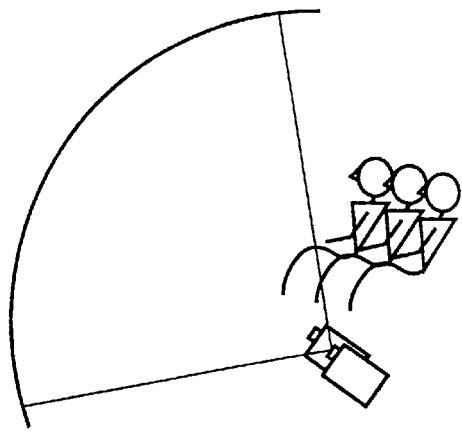
FIG. 16D is a view, useful in explaining an image projection system for projecting an image from below according to the fifth embodiment.
Figure 16E:
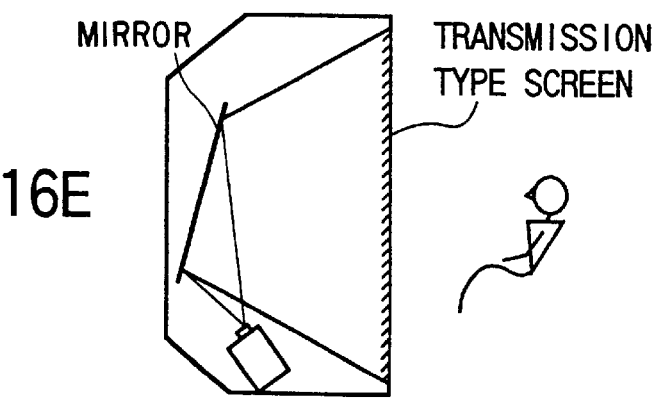
FIG. 16E is a view, useful in explaining a rear projection type image projection system according to the fifth embodiment.

As is shown in FIGS. 16C and 16D, projectors may be located below the observers or both above and below them. The projectors may be also located behind the screen as shown in FIG. 16E.

The image projection system of the fifth embodiment is characterized in that a screen of a shape other than a flat screen can be easily used since the projection state can be corrected from the viewpoint of the observer.

Figure 17:
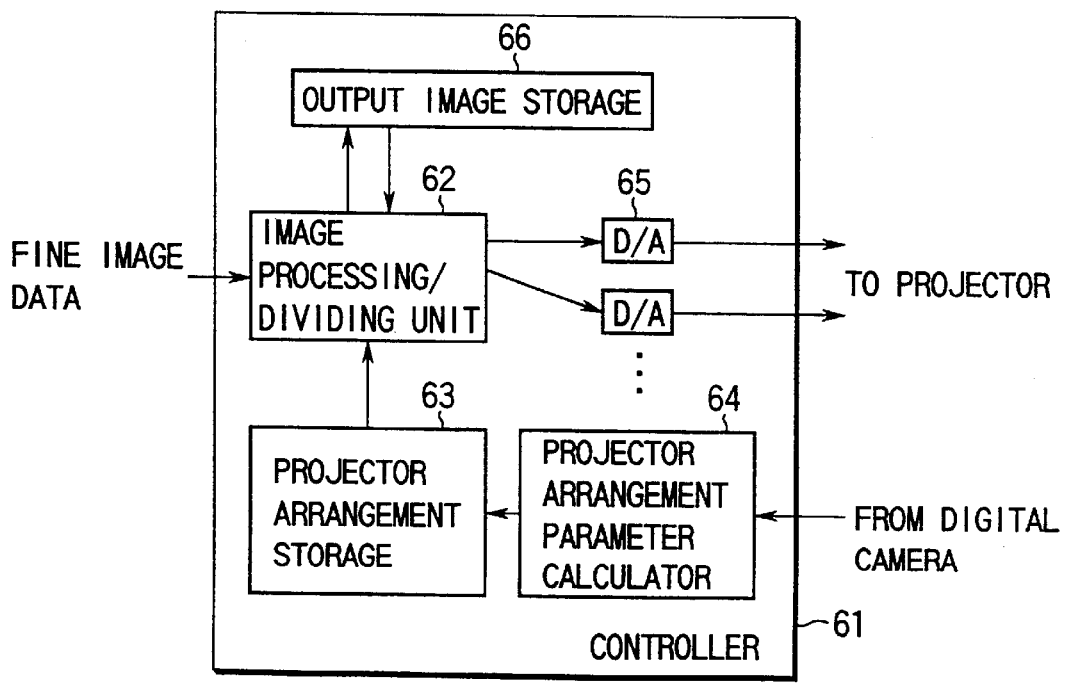
FIG. 17 is a block diagram, showing a sixth embodiment which incorporates a memory medium for storing an image to be output to each projector.

Referring then to FIG. 17, an image projection system according to a sixth embodiment will be described.

The FIG. 17 system incorporates a storage medium for storing an image output to each projector. As is shown in FIG. 17, a controller 61 comprises an image processing/dividing section 62, a projector arrangement storage 63, a projector arrangement parameter calculator 64, a D/A converter 65 and an output image storage 66.

In this structure, an image created by the image processing/dividing section 62 and to be output to each projector is temporarily stored in the output image storage 66. Images stored in the output image storage 66 are sequentially read therefrom at the time of outputting them to the projectors.

The output image storage 66 may be provided outside the controller 61. In this case, the storage medium can be constituted of an HDD (Hard Disk Drive), a CD-ROM, a DVD (Digital Video Disc), etc. The image projection system of the sixth embodiment is profitable in the case of using the same image many times.

Figure 18:
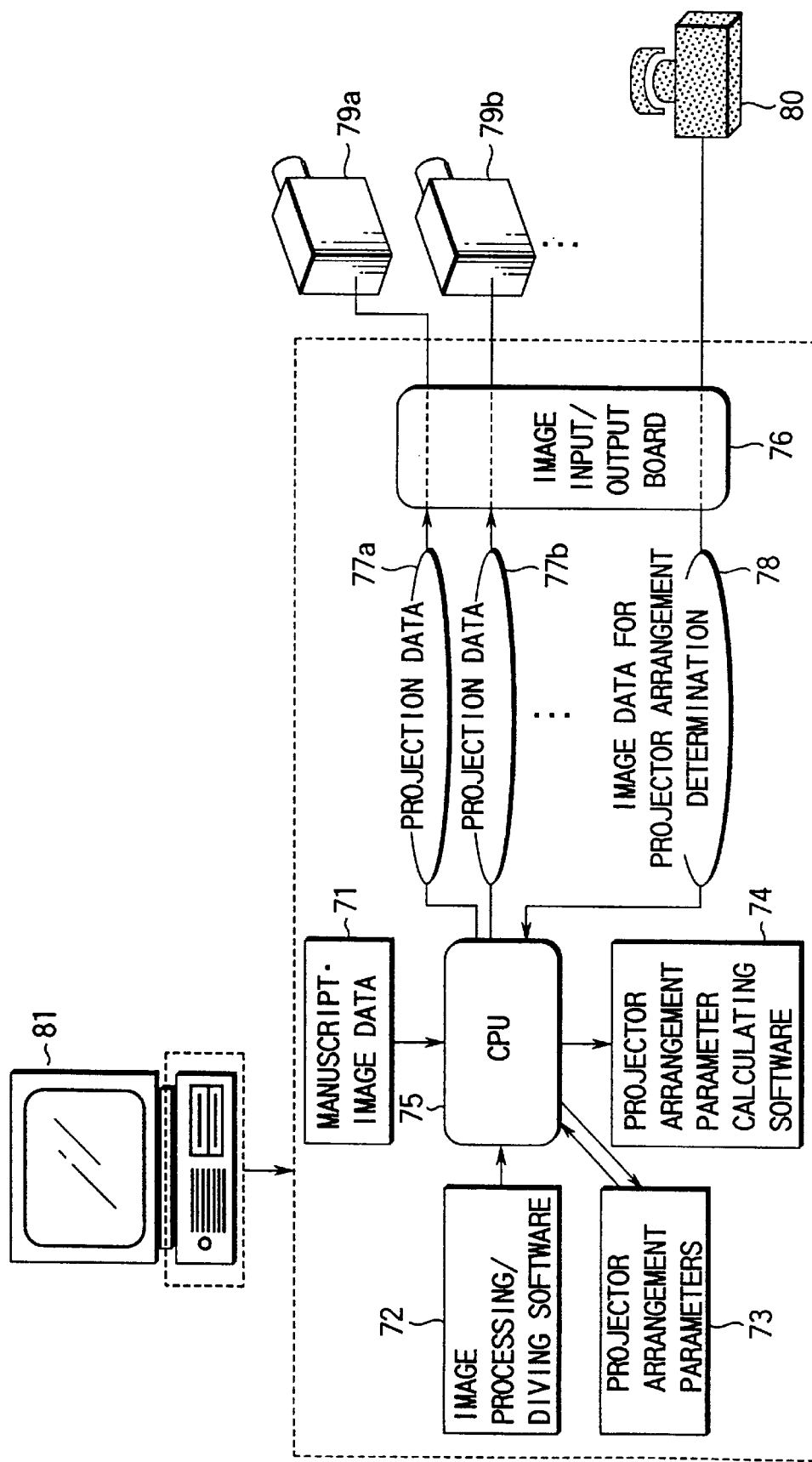
FIG. 18 is a view, showing an image projection system according to a seventh embodiment.

Referring to FIG. 18, an image projection system according to a seventh embodiment will be described. In this embodiment, software is used for processing an image.

In FIG. 18, a CPU 75 reads, from a storage medium such as a hard disk, image processing/dividing software 72 and projector arrangement parameters 73, and corrects and divides image/manuscript data 71, thereby creating projection data items 77a, 77b . . . .

The thus-created projection data items 77a, 77b. . . are output to projectors 79a, 79b. . . via an image input/output board 76, respectively. The CPU 75 also reads, from a video camera 80, projector arrangement determining image data 78 corresponding to an image obtained by photographing a projection image by means of the camera, and projector arrangement parameter software 74, thereby calculating projector arrangement parameters and storing them in the storage medium. The image projection system of the seventh embodiment can be made at a lower cost than the systems of the other embodiments which require dedicated hardware, and therefore is profitable when no animation is necessary or when images are prepared beforehand.

Figure 19:
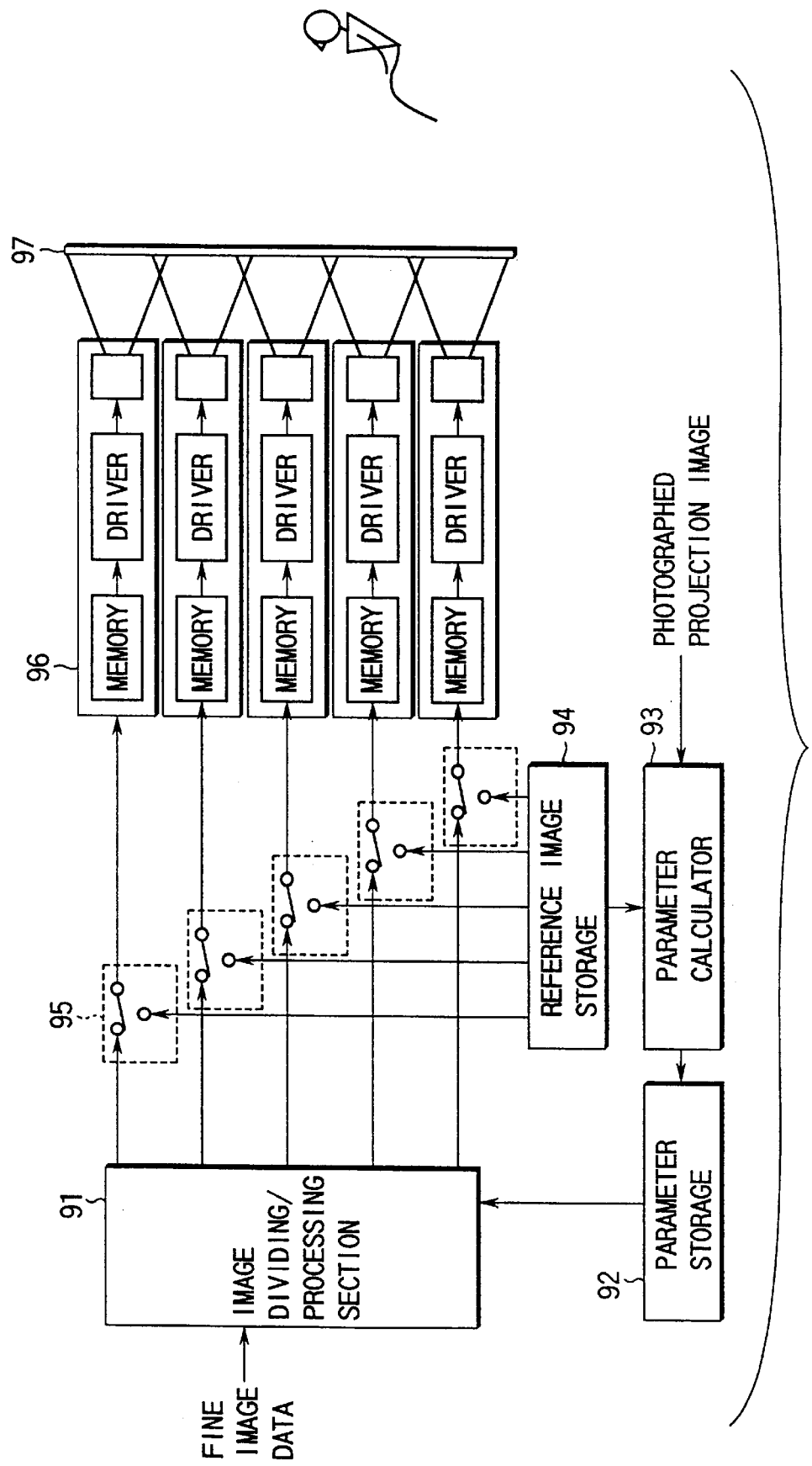
FIG. 19 is a view, useful in explaining a case where a system according to an eight embodiment is applied to a thin display.

Referring to FIG. 19, an image projection system according to an eighth embodiment will be described. This embodiment is similar to the fifth embodiment which employs a rear-projection type display, and employs multiple rear projectors of a small size (micro projectors) for realizing a thin display of high accuracy.

In FIG. 19, an image processing/dividing section 91, a parameter storage 92, a parameter calculator 93, a reference image generator 94 and an image switch section 95 have similar structures as those employed in the other embodiments. Furthermore, an image obtained by photographing, from the viewpoint of the observer, an image projected by each projector is input to the parameter calculator 93. The display employed in this embodiment is of a rear projection type, which projects an image on a screen 97 from behind the same.

The eighth embodiment is characterized in that it employs micro projectors 96 much smaller than the projectors incorporated in the other embodiments. Although in this case, each micro projector covers only a small range of projection, a large display is realized by arranging multiple micro projectors.

Also, since each micro projector does not need to have a light source of a high-level output, multiple projectors with a shallow depth can be arranged to show a much finer image than in the conventional case.

Figure 20:
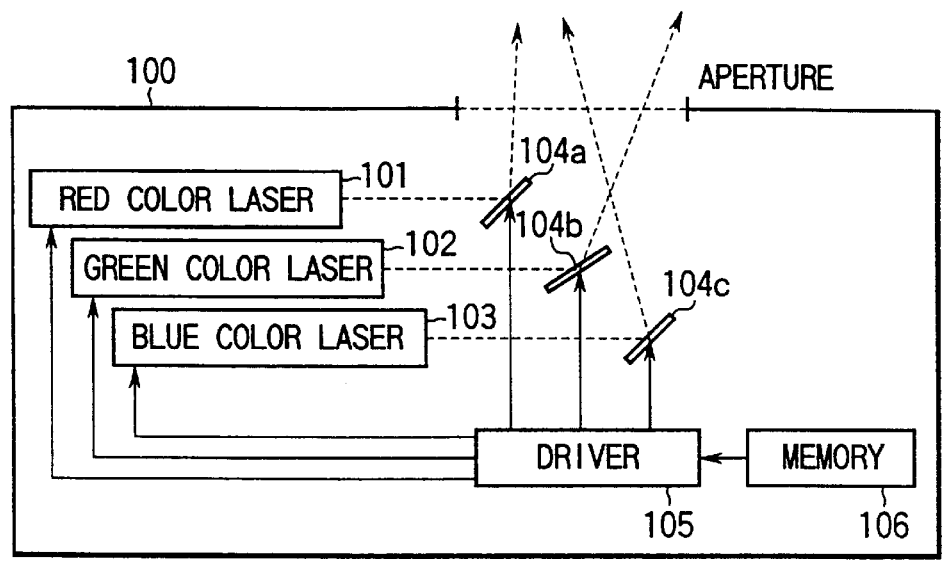
FIG. 20 is a view, showing a case where a micro projector 96 is formed by the three elementary colors of Red, Green and Blue.

FIG. 20 shows an example in which each micro projector 96 is constituted of a laser with the three elementary colors of Red, Green and Blue. In the FIG. 20 case, a driver 105 adjusts the angle of each of mirrors 104a–104c and the intensity of the output of each of lasers 101–103, thereby scanning the lasers in desired directions. Each mirror has its center portion fixed to a flexible support shaft, and its angle varied by an electromagnet in two directions.

Although in the FIG. 20 case, a single mirror controls the direction of a single laser, it may be modified such that two mirrors control the X- and Y-directions of a single laser, respectively. Recently, semiconductor lasers for emitting Green and Blue laser beams have been put to practice, following a laser for emitting a Red laser beam. If an output device which comprises very small scanning projectors constituted of those semiconductor lasers is used, a display with a relatively shallow depth for its screen size can be made.

The micro projector can be constituted of a LED array or an element called a "Digital Micromirror Device (DMD)".

Figure 22:
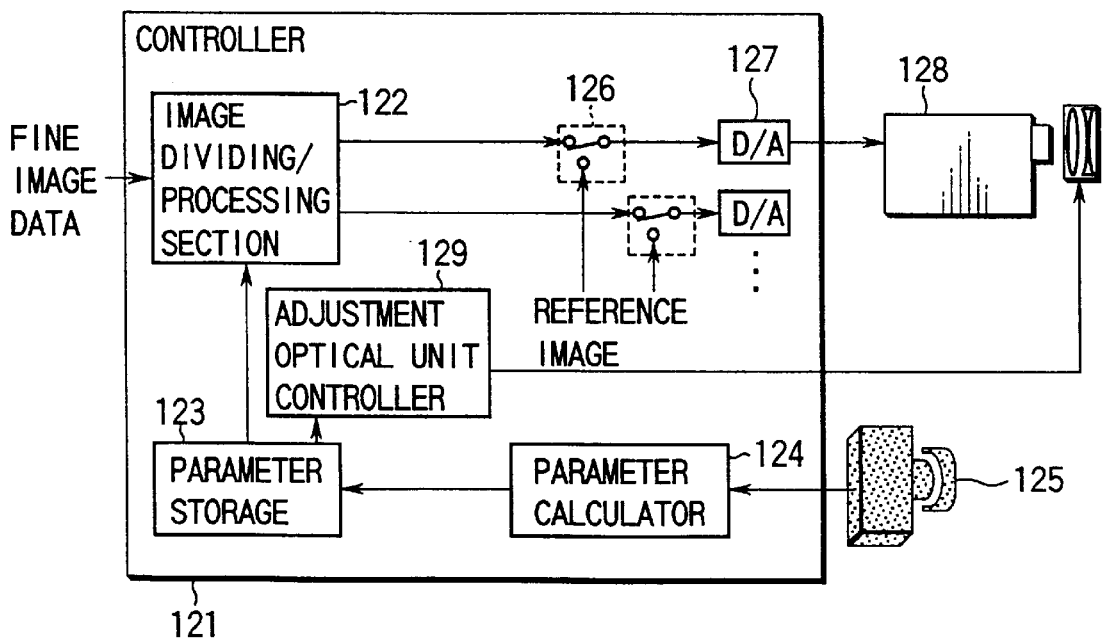
FIG. 22 is a view, showing the structure of an image projection system according to the ninth embodiment.
Figure 23:
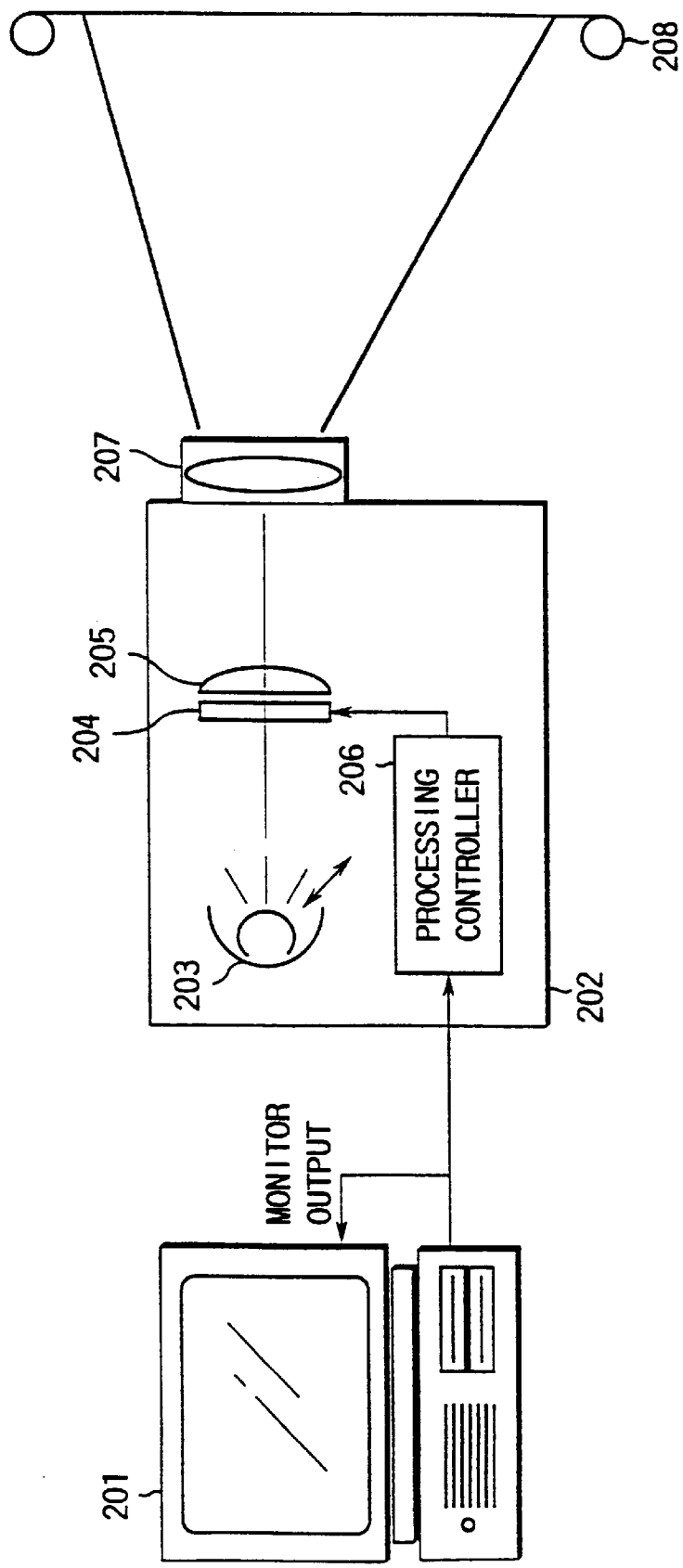
FIG. 23 is a view, showing the conventional image projection system.

Referring to FIG. 22, an image projection system according to a ninth embodiment will be described, in which correction of an image is performed by an adjustment optical unit located in front of each projector.

In FIG. 22, a controller 121 comprises an image processing/dividing section 122, a parameter storage 123, a parameter calculator 124, an image switch section 126, and a D/A converter 127. As in the case of the above-described controllers, the controller 121 calculates parameters necessary for performing accurate projection, on the basis of an image obtained by photographing a projection image by means of a digital camera 125.

The ninth embodiment further comprises an adjustment optical unit 128 and an adjustment optical unit controller 129. The adjustment optical unit controller 129 controls, on the basis of parameters stored in the parameter storage, the adjustment optical unit 128 provided in front of the projector lens such that an accurate image is projected onto the screen. The adjustment optical unit 128 consists of a group of positive lenses and a group of negative lenses. If the system 128 has shifting and tilting mechanisms, it can adjust the shift state, the "swing & tilt" state and/or the blurred state of an image.

Figure 21:
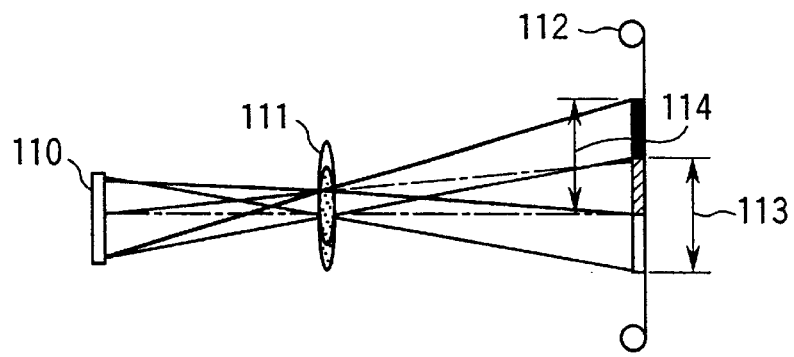
FIG. 21 is a view, useful in explaining an image shift adjustment employed in a ninth embodiment.

FIG. 21 is a view, useful in explaining adjustment of a shifted image.

Where a lens is situated in the hatched area in FIG. 21 and the LCD surface is situated across the optical axis, an image is projected in the area of the screen denoted by reference numeral 113. If the lens is shifted upward, the image is projected in the area denoted by reference numeral 114. Moreover, a blurred image or a swung & tilted image can be corrected by the tilting mechanism or adjustment of each interval between the lenses of the adjustment optical unit.

Although in the ninth embodiment, correction is performed by adjusting only the optical system, it is performed by combining this adjustment and correction processing in the image processing/dividing section.

The invention is also applicable to a projector which incorporates a CRT in place of the LCD.

The above-described embodiments provide the following advantages:

First, in the invention, data indicative of a very fine image is divided into a plurality of data items and then these data items are projected onto a screen by means of a plurality of projectors. Therefore, a manuscript image having a higher resolution than the liquid crystal panel of each projector can be displayed on the screen.

Second, at the time of supplying the divided data items of the fine image data to the respective projectors, an image to be output to each projector is created on the basis of a prestored projection state. Therefore, projection can be automatically performed after adjustment.

Third, an image having its "swing & tilt" state, etc. corrected is output to each projector. Accordingly, a projection image with great fidelity to an original one can be obtained.

Fourth, a projection image formed of images projected from a plurality of projectors is photographed by a photographing device located in the vicinity of observers, and parameters for automatically correcting the positional relationship between the projectors or deformation of the projection image are calculated on the basis of image data from the photographing device. Accordingly, a high accuracy projector unit comprising a plurality of projectors can be very easily set.

Fifth, an image is taken which corresponds to a projection image having its characterizing points designated by a pointing device such as a high brightness LED, a laser pointer, etc. with a brightness sufficiently higher than image data. Therefore, the projector arrangement parameters can be calculated easily.

Sixth, providing the pointing device in each projector enables automatic and accurate designation of the characterizing points of the projection image.

Seventh, since a plurality of images generated from a plurality of projectors can be superposed easily, the system of the invention can be used as a high brightness projector unit or a multi-gradient projector unit.

Eighth, since the system of the invention can estimate a projection image from the viewpoint of the observer, projection of an image on a screen other than a flat one can be easily set.

Ninth, using a transmission type screen and a scanning projector with a semiconductor laser enables a very thin display to be realized by very simple setting.

Tenth, where the same image is to be output to a projector several times, provision of an output image storage for storing an image once output to a projector enables the same calculation for the same image to be omitted.

Eleventh, incorporating an adjustment optical unit in each projector enables correction of a blurred projection image, etc. from the projector, and hence enables synthesizing of images projected from all projectors into an accurate projection image on a screen.

The subject matter of the invention can be summarized as follows:

(1) An image projection system according to the first embodiment, which comprises:
  image generating means for generating fine image data;
  image projection means having a plurality of projectors for projecting at least part of a fine image corresponding to the fine image data; and
  image processing means for selectively processing at least part of the fine image data and outputting the processed data to the projectors.

Since in this system, fine image data is divided into a plurality of data items and then images corresponding to the data items are projected onto a plurality of projectors, a manuscript/image having a higher resolution than the liquid crystal panel CRT of each projector can be displayed. Further, since at the time of projecting the images corresponding to the image data items, to a plurality of projectors, each image to be output to a corresponding one of the projectors is created on the basis of a prestored projection state, projection after adjustment can be performed automatically.

(2) The image projection system according to item (1) and to the first embodiment, wherein the image processing means includes:
  parameter storage means for storing parameters necessary for processing for projecting accurate images by the projectors; and
  image dividing/processing means for processing and dividing the fine image data into data items on the basis of the parameters, and outputting the divided and processed data items to the projectors, respectively.

Since in this system, fine image data is divided into a plurality of data items and then images corresponding to the data items are projected onto a plurality of projectors, a manuscript/image having a higher resolution than the liquid crystal panel CRT of each projector can be displayed. Further, since at the time of projecting the images corresponding to the image data items, to a plurality of projectors, each image to be output to a corresponding one of the projectors is created on the basis of a prestored projection state, projection after adjustment can be performed automatically.

(3) The image projection system according to item (1) or (2) and to the second embodiment, which further comprises:
   photographing means for photographing, in the vicinity of the viewpoint of an observer, a projection image projected on a screen by the image projection means; and
   parameter calculating means for calculating projector arrangement parameters as position data concerning the position of each projector relative to the screen, on the basis of data indicative of an image obtained by photographing the projection image by the photographing means.

Since in this system, an image having its "swung & tilted" state corrected is output to each projector as an image to be projected therefrom, a projection image with great fidelity to its original image can be obtained. Moreover, an image is obtained by photographing images projected from the projectors located in the vicinity of the viewpoint of the observer, and the parameters for automatically correcting the positional relationship between the projectors or deformation of the projection image can be calculated on the basis of the image obtained by the photographing. Accordingly, a high accuracy projector unit using a plurality of projectors can be set very easily.

(4) The image projection system according to item (3) and to the second embodiment, wherein the projector arrangement parameters are calculated on the basis of data indicative of an image obtained by photographing, by the photographing means, predetermined at least one pattern projected from at least one of the projectors.

Since in this system, an image having its "swung & tilted" state corrected is output to each projector as an image to be projected therefrom, a projection image with great fidelity to its original image can be obtained. Moreover, an image is obtained by photographing images projected from the projectors located in the vicinity of the viewpoint of the observer, and the parameters for automatically correcting the positional relationship between the projectors or deformation of the projection image can be calculated on the basis of the image obtained by the photographing. Accordingly, a high accuracy projector unit using a plurality of projectors can be set very easily.

(5) The image projection system according to item (3) and to the third embodiment, wherein the projector arrangement parameters are calculated on the basis of data indicative of an image obtained by photographing, by the photographing means, an image having its characterizing points pointed on the screen.

Since in this system, an image obtained by pointing characterizing points of the projection image by means of a pointing device such as a LED or a laser pointer which has a sufficiently higher brightness than image data is taken in, the projector arrangement parameters can be calculated more easily. Furthermore, providing a pointing device in each projector enables accurate and automatic designation of characterizing points of the projection image.

(6) The image projection system according to item (3) and to the third embodiment, wherein the projector arrangement parameters are calculated using optical sensors arranged on the screen.

In this system, the characterizing points of the projection image can be designated accurately and automatically by sensing the projection image by means of the optical sensors on the screen.

(7) The image projection system according to item (3) and to the fourth embodiment, wherein corresponding portions of the images projected by the projectors are situated in a corresponding portion of the screen.

Since in this system, images projected from the projectors can be easily and accurately superposed on the screen, the system can be used as a high brightness projector system or a multi-gradient projector system.

(8) The image projection system according to item (2) or (3) and to the eighth embodiment, wherein the screen on which images from the projectors are projected is of a type other than a flat type.

Since this system can perform estimation from the viewpoint of an observer, projection of an image on a screen other than a flat screen can be easily adjusted.

(9) The image projection system according to item (2) or (3) and to the fifth embodiment, wherein the images from the projectors are projected onto a transmission type screen.

Since this system can perform estimation from the viewpoint of an observer, it can easily project an image on a screen other than a reflection type screen.

(10) The image projection system according to item (2) or (3) and to the sixth embodiment, further comprising an output image storage for storing the divided and processed data items created by the image dividing/processing means and to be output to the projectors.

Since the output image storage incorporated in this system can store an image once created and to be output to each projector, it is not necessary, in the case of using the image several times, to perform calculation each time the image is used.

(11) The image projection system according to item (2) or (3) and to the ninth embodiment, wherein the image projection means has an adjustment optical unit for adjusting the projection state of each projector to accurately synthesize the images projected from the projectors on a screen, and an adjustment optical unit controller for controlling the adjustment optical unit.

Since this system incorporates the adjustment optical unit in the image projection means, it can correct a blurred image, etc. from any projector, and can synthesize images generated from all projectors into an accurate projection image on a screen.

The present invention can provide an image projection system which incorporates a personal computer, a plurality of projectors, and a controller for dividing an input fine image of a high resolution to output an image signal to each projector, and can provide a fine projection image with great fidelity to the input fine image.

Additional advantages and modifications will readily occur to those skilled in the art. Therefore, the invention in its broader aspects is not limited to the specific details, and representative devices shown in described herein. Accordingly, various modifications may be made without departing from the spirit or scope of the general inventive concept as defined by the appended claims and their equivalents.

What is claimed is:
1. An image projecting system, wherein the same images projected from a plurality of projectors are overlaid on a screen to generate one image of high luminance, comprising:

parameter storage means for storing parameters necessary for projecting accurate images from the projectors, said parameters including a first parameter which corrects distortion caused by positional relationships between the plurality of projectors and the screen, and a second parameter which records the positional relationships of the images projected by the plurality of projectors;

image processing means for correcting the distortion of the image from each of the projectors based on the parameters stored in said parameter storage means, and for adjusting the images so that the images are overlaid upon one another correctly; and image outputting means for outputting image signals corrected in said image processing means to the plurality of projectors.

2. The image projecting system according to claim 1, further comprising:

projection image generating means for generating a projection image;

photographing means positioned in the vicinity of a viewpoint of an observer for photographing said projection image projected by the projectors; and parameter calculating means for calculating the first and/or the second parameter by using the projection image photographed by said photographing means, wherein said parameter storage means records at least one of the first and the second parameter calculated by said parameter calculating means.

3. The image projecting system according to claim 2, further comprising:

distortion correcting means for correcting distortion of the projection image generated by the image photographing means, said projection image being photographed between said image photographing means and said parameter calculating means, wherein said parameter calculating means calculates the first and/or the second parameter by using the projection image whose distortion is corrected by said distortion correcting means.

4. The image projecting system according to claim 2, wherein:

said image photographing means successively photographs the projection image projected on the screen, said projection image processing means slightly deforms the projection image based on the parameters calculated by said calculating means so that the distortion is reduced, the distortion being caused by the positional relationships among the images projected by said plurality of projectors and the positional relationships between the projectors and the screen, and said parameters stored in said parameter storage means are parameters sequentially rewritten by the first and the second parameters which are slightly changed.

5. The image projecting system according to claim 2, wherein:

said photographing means photographs an image projected by one of the plurality of projectors for projecting reference images in turn, and said parameter calculating means calculates the first parameter of each projector based on image data obtained by said photographing means and corresponding to each of the projectors.

6. The image projecting system according to claim 2, wherein:

said photographing means photographs the images projected by the plurality of projectors for projecting the reference images, colors of said reference images vary depending on the projectors, and said parameter calculating means calculates the first parameter of each projector judging from colors of the image data obtained by said photographing means.

7. The image projecting system according to claim 2, wherein:

when said photographing means photographs an entire image projected by the plurality of projectors, said parameter calculating means calculates a rough estimate value of the second parameter based on the image data of the entire image obtained by said photographing means, and when said photographing image means photographs, in an enlarged scale, overlapping parts of said entire image projected by the projectors, said parameter calculating means calculates an accurate value of the second parameter based on the enlarged overlapping parts photographed by said photographing means.

8. The image projecting system according to claim 1, wherein said screen is a transmission type screen.

9. The image projecting system according to claim 1, further comprising:

image storage means for storing the image corrected by said image processing means, wherein said image outputting means outputs the image read from said image storage means.

10. The image projecting system according to claim 9, wherein said image processing means is provided in accordance with every image outputting means of the projectors.

11. An image projecting system, wherein exactly the same images projected from a plurality of projectors, each of which projects an image of an M gradation, are overlaid on a screen to generate one multi-gradient image of an M or greater gradation, comprising:

parameter storage means for storing parameters necessary for projecting accurate images from the projectors, said parameters including a first parameter which corrects distortion caused by positional relationships between the plurality of projectors and the screen, and a second parameter which records the positional relationships of the images projected by the plurality of projectors;

image processing means for correcting the distortion of the image from each of the projectors based on the parameters stored in said parameter storage means, and for adjusting the images so that the images are overlaid over one another correctly; and image outputting means for changing a gradation of the image projected by each of the plurality of projectors by controlling image signals corrected in said image processing means and outputting the image signals to the plurality of projectors.

12. The image projecting system according to claim 11, further comprising:

projection image generating means for generating a projection image;

photographing means positioned in the vicinity of a viewpoint of an observer for photographing said projection image projected by the projectors; and parameter calculating means for calculating the first and/or the second parameter by using the projection image photographed by said photographing means, wherein said parameter storage means records at least one of the first and the second parameter calculated by said parameter calculating means.

13. The image projecting system according to claim 12, further comprising:

distortion correcting means for correcting distortion of the projection image generated by the image photographing means, said projection image being photographed between said image photographing means and said parameter calculating means, wherein said parameter calculating means calculates the first and/or the second parameter by using the projection image whose distortion is corrected by said distortion correcting means.

14. The image projecting system according to claim 12, wherein:

said image photographing means successively photographs the projection image projected on the screen, said projection image processing means slightly deforms the projection image based on the parameters calculated by said calculating means so that the distortion is reduced, the distortion being caused by the positional relationships among the images projected by said plurality of projectors and the positional relationships between the projectors and the screen, and said parameters stored in said parameter storage means are parameters sequentially rewritten by the first and the second parameters which are slightly changed.

15. The image projecting system according to claim 12, wherein:

said photographing means photographs an image projected by one of the plurality of projectors for projecting reference images in turn, and said parameter calculating means calculates the first parameter of each projector based on image data obtained by said photographing means and corresponding to each of the projectors.

16. The image projecting system according to claim 12, wherein:

said photographing means photographs the images projected by the plurality of projectors for projecting the reference images, colors of said reference images vary depending on the projectors, and said parameter calculating means calculates the first parameter of each projector judging from colors of the image data obtained by said photographing means.

17. The image projecting system according to claim 12, wherein:

when said photographing means photographs an entire image projected by the plurality of projectors, said parameter calculating means calculates a rough estimate value of the second parameter based on the image data of the entire image obtained by said photographing means, and when said photographing image means photographs, in an enlarged scale, overlapping parts of said entire image projected by the projectors, said parameter calculating means calculates an accurate value of the second parameter based on the enlarged overlapping parts photographed by said photographing means.

18. The image projecting system according to claim 11, wherein said screen is a transmission type screen.

19. The image projecting system according to claim 11, further comprising:

image storage means for storing the image corrected by said image processing means, wherein said image outputting means outputs the image read from said image storage means.

20. The image projecting system according to claim 19, wherein said image processing means is provided in accordance with every image outputting means of the projectors.

* * * * *